United States Patent [19]
Vlahovic

[11] Patent Number: 6,015,183
[45] Date of Patent: Jan. 18, 2000

[54] CENTER TUNNEL FOR A MOTOR VEHICLE AND METHOD OF MAKING SAME

[75] Inventor: Josip Vlahovic, Bietigheim-Bissingen, Germany

[73] Assignee: Dr. Ing. h.c.F. Porsche AG, Weissach, Germany

[21] Appl. No.: 08/893,545

[22] Filed: Jul. 8, 1997

[30] Foreign Application Priority Data

Jul. 30, 1996 [DE] Germany .................. 196 30 645

[51] Int. Cl.⁷ .................................................. B62D 25/20
[52] U.S. Cl. ................................................... 296/204
[58] Field of Search ........................................ 296/204

[56] References Cited

U.S. PATENT DOCUMENTS

| 5,102,187 | 4/1992 | Harasaki ................. 296/204 |
| 5,611,593 | 3/1997 | Fukagawa et al. ......... 296/204 |

FOREIGN PATENT DOCUMENTS

| 0451478A1 | 10/1991 | European Pat. Off. . |
| 0494552 | 7/1992 | European Pat. Off. . |
| 2408548C2 | 8/1975 | Germany . |
| 4214557 | 11/1993 | Germany . |
| 2225825 | 6/1990 | United Kingdom . |

OTHER PUBLICATIONS

Search Report, Mar. 24, 1998, Europe.
Search Report, Jul. 29, 1979, Europe.

*Primary Examiner*—Gary C. Hoge
*Attorney, Agent, or Firm*—Evenson McKeown Edwards & Lenahan PLLC

[57] ABSTRACT

A center tunnel for a vehicle, especially a motor vehicle, has a section shape that is open at the bottom and has sections in the form of hollow members that are directed lengthwise, at least areawise. A center tunnel that has a simple design and can be manufactured economically, and which is torsionally rigid and can accept high forces, is formed by a double-walled hollow body manufactured by the internal high-pressure shaping method, viewed in cross section, with spaced wall sections of the hollow body being brought together areawise.

14 Claims, 2 Drawing Sheets

CENTER TUNNEL FOR A MOTOR VEHICLE AND METHOD OF MAKING SAME

BACKGROUND AND SUMMARY OF THE INVENTION

This application claims the priority of German application 196 30 645.0 filed Jul. 30, 1996, the disclosure of which is expressly incorporated by reference herein.

The invention relates to a center tunnel for a vehicle, especially a motor vehicle, that has a shape that is open at the bottom.

German Patent 24 08 548 C2 teaches a center tunnel for a motor vehicle made in one piece with a floor panel, with two shaped closing panels being mounted to stiffen the center tunnel at its interior, said panels forming hollow supporting structures extending locally lengthwise together with the center tunnel.

A center tunnel of this kind requires considerable tool and assembly costs. In addition, the center tunnel is reinforced only in partial areas while it is relatively weak in the transition area to the adjoining floor part.

An object of the invention is to improve on a center tunnel in such fashion that it can accept high forces with a simple design and economical manufacture.

According to the invention, this object is achieved by the providing an arrangement wherein the center tunnel, viewed in cross section, is formed by a double-walled hollow body produced by the internal high-pressure shaping method, with spaced wall sections of the hollow body being brought together areawise.

Primary advantages achieved by the invention consist in the fact that the center tunnel, made by internal high-pressure shaping, has a simple structure and can be manufactured economically. The hollow body that forms the center tunnel, open downward and having double walls, has a high level of torsional stiffness and can accept high forces, since it is composed of a plurality of hollow chambers. For this purpose, locally abutting wall sections of the hollow body are joined together mechanically by internal high-pressure shaping and are additionally connected is permanently with one another (for example by riveting).

The joining process is accomplished for example by mechanical compression of the inside wall or outside wall of the hollow body. In addition, supporting areas for adjoining body parts are formed externally on the center tunnel.

Other objects, advantages and novel features of the present invention will become apparent from the following detailed description of the invention when considered in conjunction with the accompanying drawings.

DETAILED DESCRIPTION OF THE DRAWINGS

Figure 1:
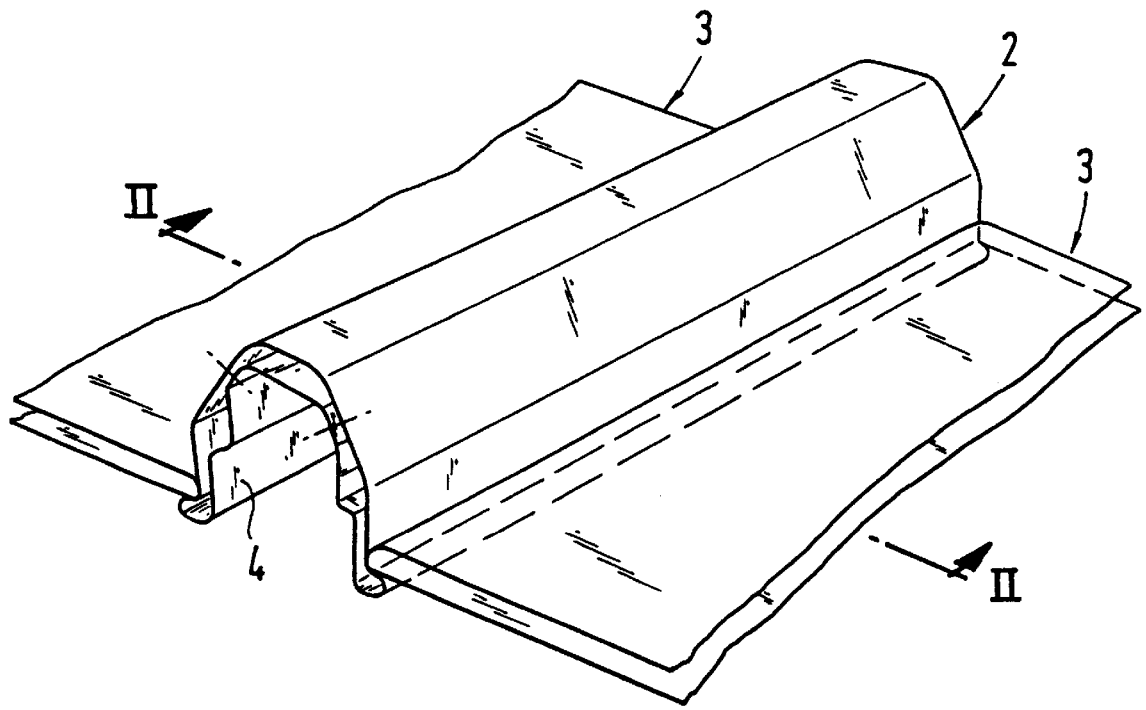
FIG. 1 is a perspective partial view of the floor area of a motor vehicle with a center tunnel, constructed in accordance with a preferred embodiment of the present invention.

The floor structure 1 of a motor vehicle as shown in FIG. 1 comprises a center tunnel 2 extending in the lengthwise direction of the vehicle, to which floor sections 3 are connected on both sides. Floor sections 3 can each be formed by a conventional single-layer floor panel with two floor panels spaced heightwise, or according to FIGS. 1 and 2, by a hydroformed part in the form of a hollow body.

Center tunnel 2, viewed in cross section, is formed by a double-walled hollow body 4 made of lightweight metal or steel, produced by the internal high-pressure shaping method, said body having an approximately U-shaped or groove-shaped profile open at the bottom, with at least locally spaced wall sections 5, 6 of hollow body 4 being brought together and permanently joined to one another. Hollow body 4, extending lengthwise, in the initial state is a tube or a section.

Figure 3:
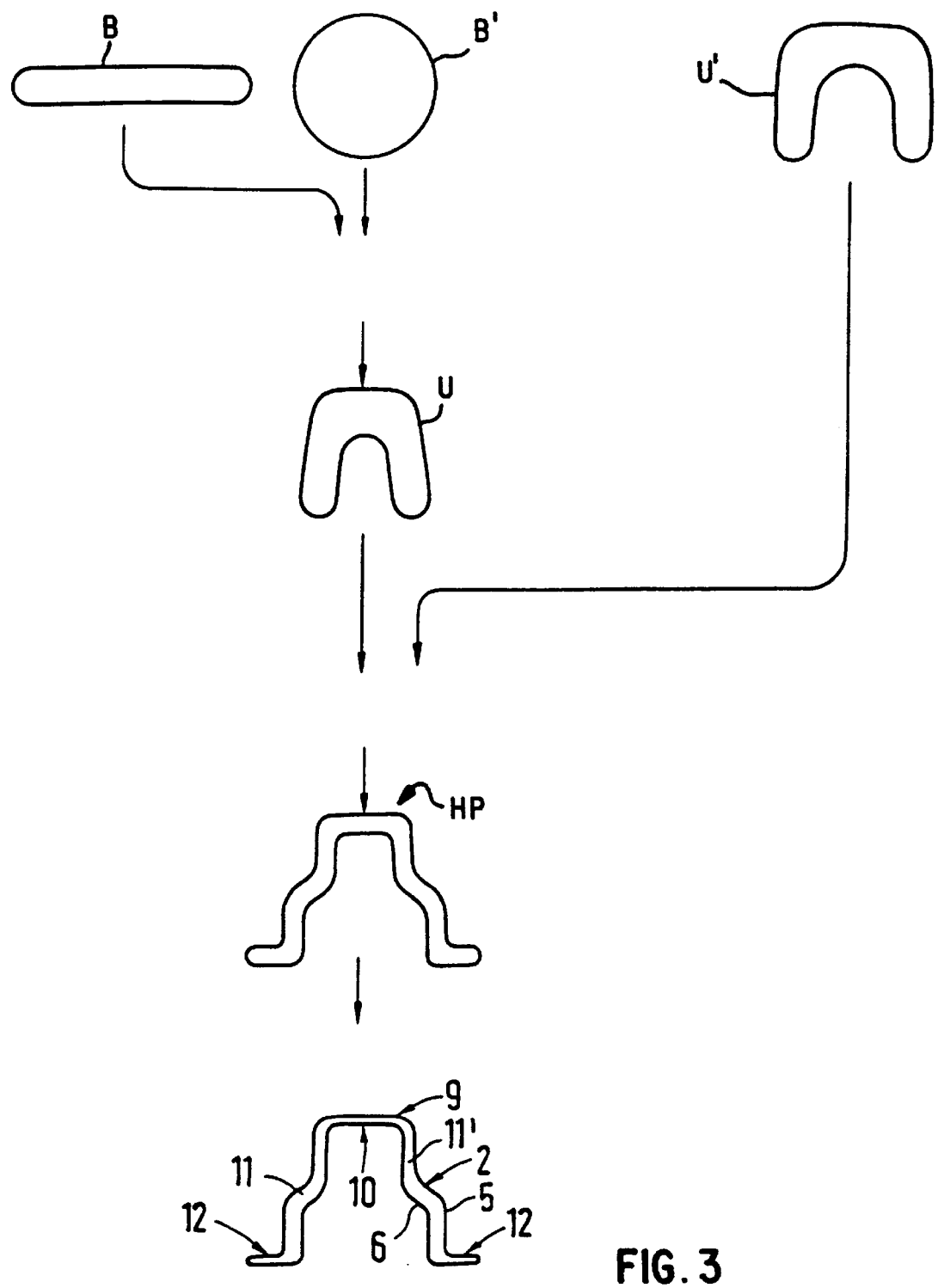
FIG. 3 is a schematic view of the individual steps in manufacturing the center tunnel according to preferred embodiments of the present invention.

FIG. 3 shows the individual method steps for manufacturing center tunnel 2. A blank B or B' that is formed by a tube with a circular cross section or a noncircular cross section is preshaped mechanically in an initial method step to form an approximately U-shaped section U. This method step is eliminated when a U-shaped section is used. This is followed by the shaping of the preshaped blank or section using the internal high-pressure shaping method (HP in FIG. 3).

In a further step, mechanical compression is performed so that outside wall 5 and inside wall 6 abut one another locally.

Figure 2:
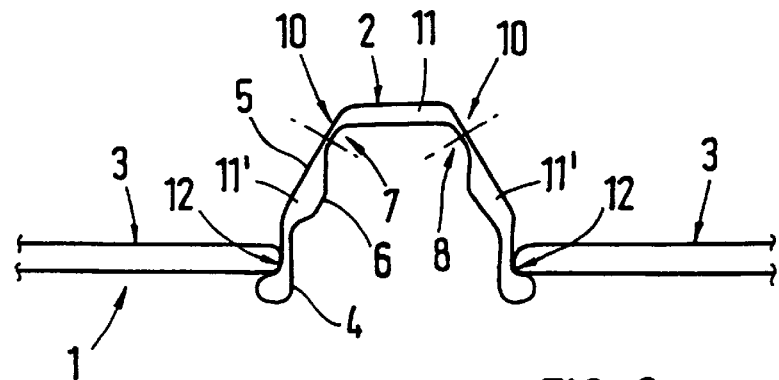
FIG. 2 is a section along line II—II in FIG. 1.

According to FIGS. 1 and 2, inside wall 6 in an upper area of hollow body 4, in areas 7, 8 that run diagonally, is brought up against outside wall 5. This is accomplished for example by mechanical compression.

In center tunnel 2 shown in FIG. 3 an upper section 9 of inside wall 6 that runs transversely and is directed approximately horizontally is brought up to outside wall 5.

Hollow body 4 is divided into at least two adjoining hollow chamber sections 11, 11' by the common supporting areas 10 of the inside and outside walls 5 and 6. For additional stiffening, inside and outside walls 5, 6 can be joined together in a common contact area 10. This can be accomplished by welding, gluing, riveting or the like. Center tunnel 2, viewed in cross section, has the structure of a hollow member throughout the entire area, composed of a plurality of hollow member sections.

In a lower area of the roughly hat-shaped center tunnel 2, supporting areas 12 are provided externally for adjoining body parts.

According to FIGS. 1 and 2, horizontal floor sections 3 rest on step-shaped supporting areas 12 of hollow body 4 and are fastened thereto (for example by gluing, welding, riveting or the like).

According to FIG. 3, outside and inside walls 5 and 6 are likewise pressed together at supporting areas 12, at least areawise.

The center tunnel can have a cross section that remains constant in the lengthwise direction or changes along its length.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Center tunnel for a vehicle, especially a motor vehicle, with the center tunnel, that has a shape that is open at the bottom, having lengthwise sections in the form of hollow members, at least areawise, wherein the center tunnel, viewed in cross section, is formed by a double-walled hollow body produced by the internal high-pressure shaping method, with spaced wall sections of the hollow body being brought together areawise.

2. Center tunnel according to claim 1, wherein the hollow body has a shape of a tube or U in the initial state.

3. Center tunnel according to claim 1, wherein spaced walls of the hollow body, following internal high-pressure shaping, are brought together in mutual contact by mechanical compression.

4. Center tunnel according to claim 1, wherein the abutting wall sections of the hollow body are additionally joined to one another.

5. Center tunnel according to claim 1, wherein the adjoining wall sections are permanently connected to one another by one of welding, gluing, and riveting.

6. Center tunnel according to claim 1, wherein supporting areas for adjoining body parts are formed externally on the center tunnel.

7. Center tunnel according to claim 2, wherein the abutting wall sections of the hollow body are additionally joined to one another.

8. Center tunnel according to claim 3, wherein the abutting wall sections of the hollow body are additionally joined to one another.

9. Center tunnel assembly for a passenger car that has a downwardly open central area, comprising:
a double-walled hollow body produced by an internal high-pressure shaping method, spaced wall sections of the hollow body being brought together.

10. Center tunnel assembly according to claim 9, wherein the hollow body has a shape of a tube or U in the initial state.

11. Center tunnel assembly according to claim 10, wherein spaced walls of the hollow body, following internal high-pressure shaping, are brought together in mutual contact by mechanical compression.

12. Center tunnel assembly according to claim 11, wherein the abutting wall sections of the hollow body are additionally joined to one another.

13. Center tunnel assembly according to claim 12, wherein the adjoining wall sections are permanently connected to one another by one of welding, gluing, and riveting.

14. Center tunnel assembly according to claim 13, wherein supporting areas for adjoining body parts are formed externally on the center tunnel.

* * * * *